United States Patent [19]
Weinstein

[11] Patent Number: 5,306,421
[45] Date of Patent: Apr. 26, 1994

[54] FILTRATION SYSTEM FOR A FISH TANK

[75] Inventor: Stuart Weinstein, Brooklyn, N.Y.

[73] Assignee: T Y & G, Inc., Woodmere, N.Y.

[21] Appl. No.: 859,665

[22] Filed: Mar. 30, 1992

Related U.S. Application Data

[63] Continuation-in-part of Ser. No. 532,061, Jun. 1, 1990, abandoned.

[51] Int. Cl.⁵ ............................................. A01K 63/04
[52] U.S. Cl. ................................... 210/151; 210/169; 210/416.2; 119/248; 119/260
[58] Field of Search .................... 210/169, 416.2, 151, 210/221.2; 119/5

[56] References Cited

U.S. PATENT DOCUMENTS

| | | | |
|---|---|---|---|
| 3,294,239 | 3/1963 | Dayes | 210/90 |
| 3,313,421 | 4/1967 | Falkenberg et al. | 210/169 |
| 3,377,991 | 4/1968 | Rubert | 119/5 |
| 3,774,766 | 11/1973 | Brock | 210/169 |
| 3,815,547 | 6/1974 | Willinger et al. | 119/5 |
| 3,835,813 | 9/1974 | Katz | 119/5 |
| 3,994,811 | 11/1976 | Cohen et al. | 210/169 |
| 4,002,566 | 1/1977 | Smith | 210/169 |
| 4,004,551 | 1/1977 | Kato | 119/5 |
| 4,036,756 | 7/1977 | Dockery | 210/169 |
| 4,064,837 | 12/1977 | Montgomery | 119/5 |
| 4,606,821 | 8/1986 | D'Imperio | 119/5 |
| 4,817,561 | 4/1989 | Byrne et al. | 119/5 |
| 4,844,013 | 7/1989 | de Haan et al. | 119/5 |
| 4,851,112 | 7/1989 | Schlensker | 210/169 |
| 4,861,465 | 8/1989 | Augustyniak | 119/5 |
| 4,863,594 | 9/1989 | Pedretti | 119/5 |
| 4,915,828 | 4/1990 | Meyers et al. | 210/169 |
| 4,966,096 | 10/1990 | Adey | 119/5 |
| 4,988,436 | 1/1991 | Cole | 119/5 |
| 5,171,438 | 12/1992 | Korcz | 210/169 |
| 5,172,650 | 12/1992 | Hsu et al. | 210/169 |

OTHER PUBLICATIONS

The Marine Aquarium Reference, By Martin Moe, pp. 242-243, Jul. 1989.

*Primary Examiner*—Peter Hruskoci
*Assistant Examiner*—Robert James Popovics
*Attorney, Agent, or Firm*—Galgano & Belkin

[57] ABSTRACT

An internally-situated filter assembly for an aquarium tank includes an upright tank partition wall mounted within the aquarium for dividing the aquarium into an aquarium compartment and a filter compartment, an inlet formed in the partition wall generally adjacent to the top end thereof for allowing tank water in the aquarium compartment to flow into the filter compartment and an outlet formed in the partition wall for allowing filtered tank water to flow from the filter compartment into the aquarium compartment. A filter is mounted in the filter compartment generally beneath the inlet so that tank water may be fed thereto under the influence of gravity from the aquarium compartment and a catch basin is formed beneath and adjacent the bottom end of the filter compartment for collecting filtered water from the filter. A pump returns filtered water collected in the catch basin to the aquarium compartment. The filter assembly is especially intended for small salt water reef tanks.

16 Claims, 6 Drawing Sheets

FIG. 4
FIG. 5
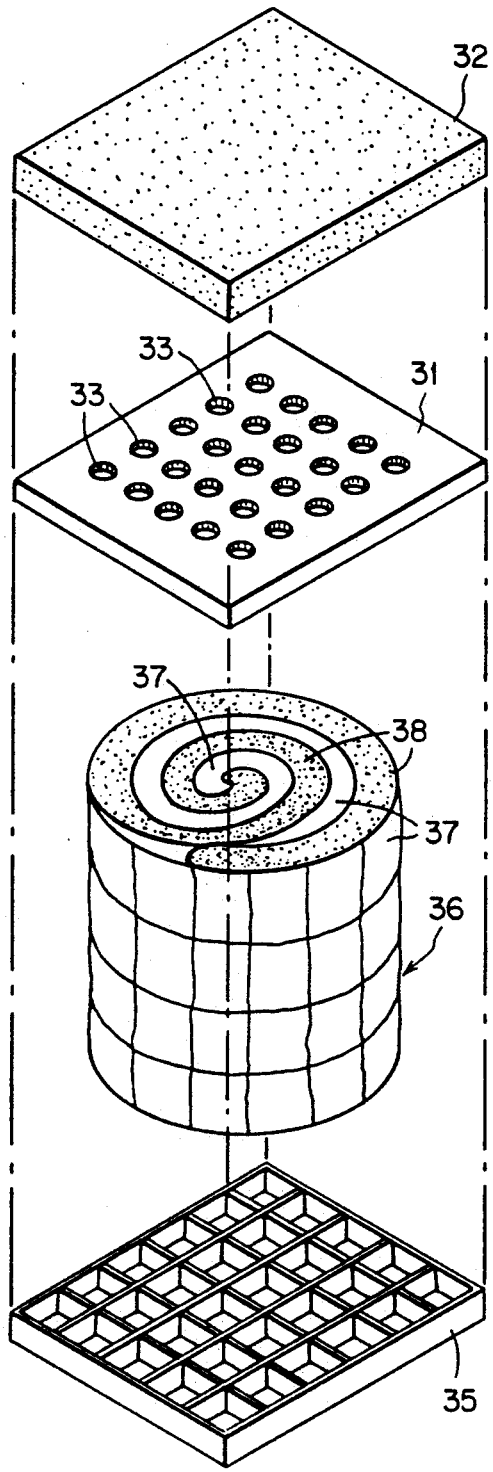
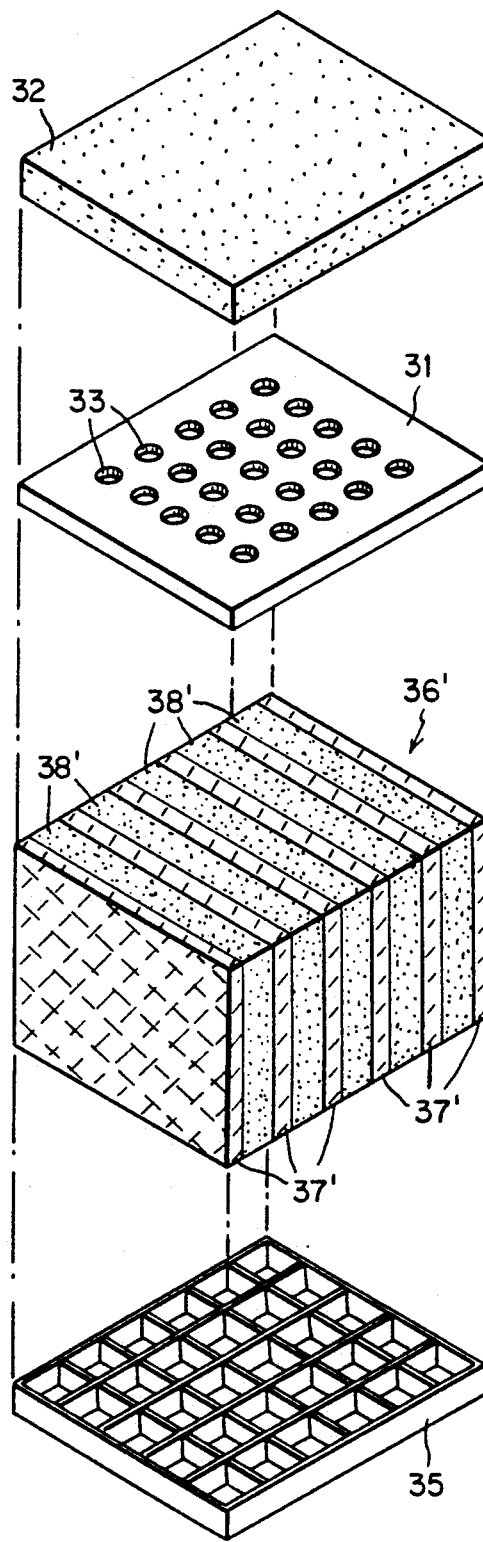

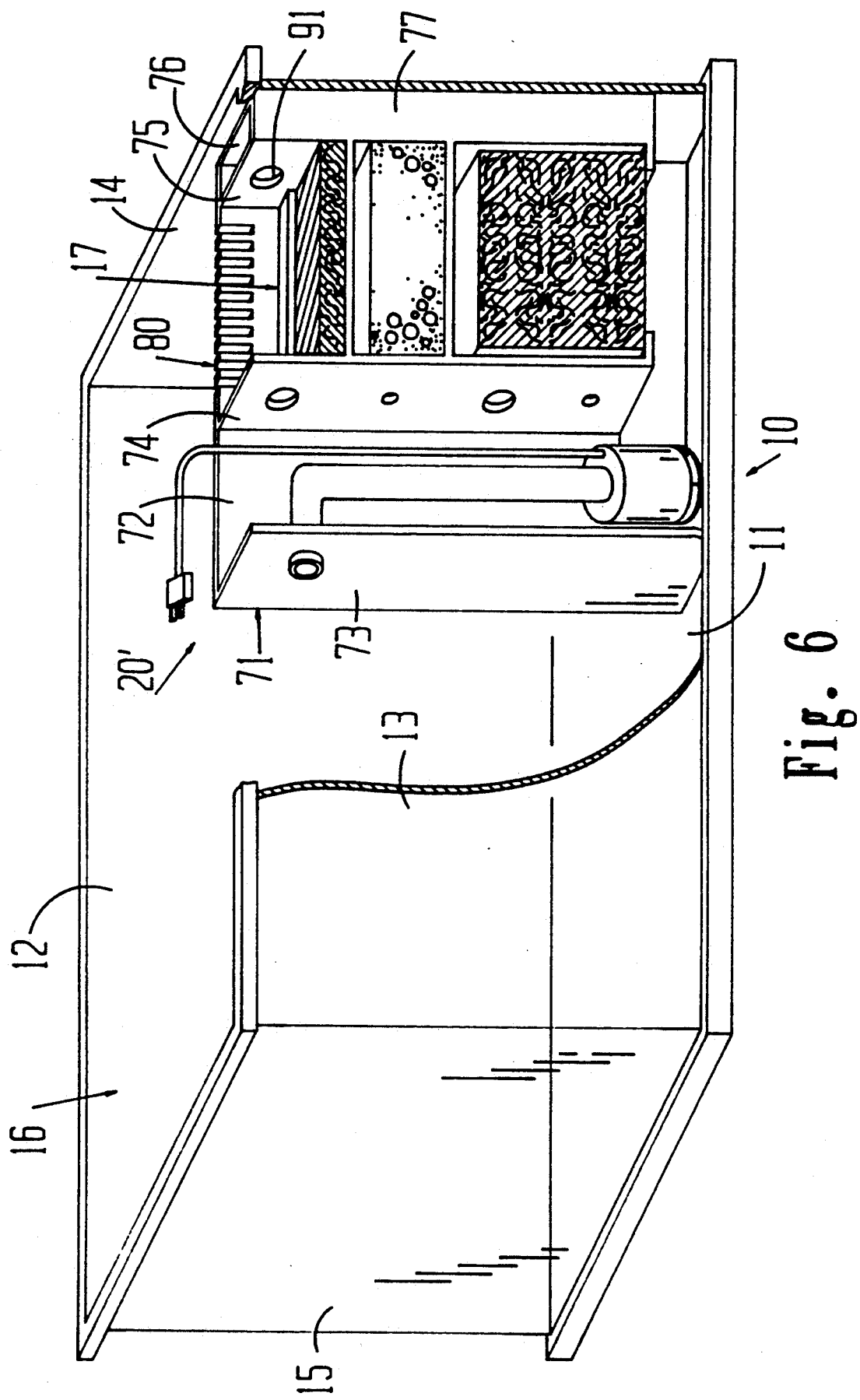

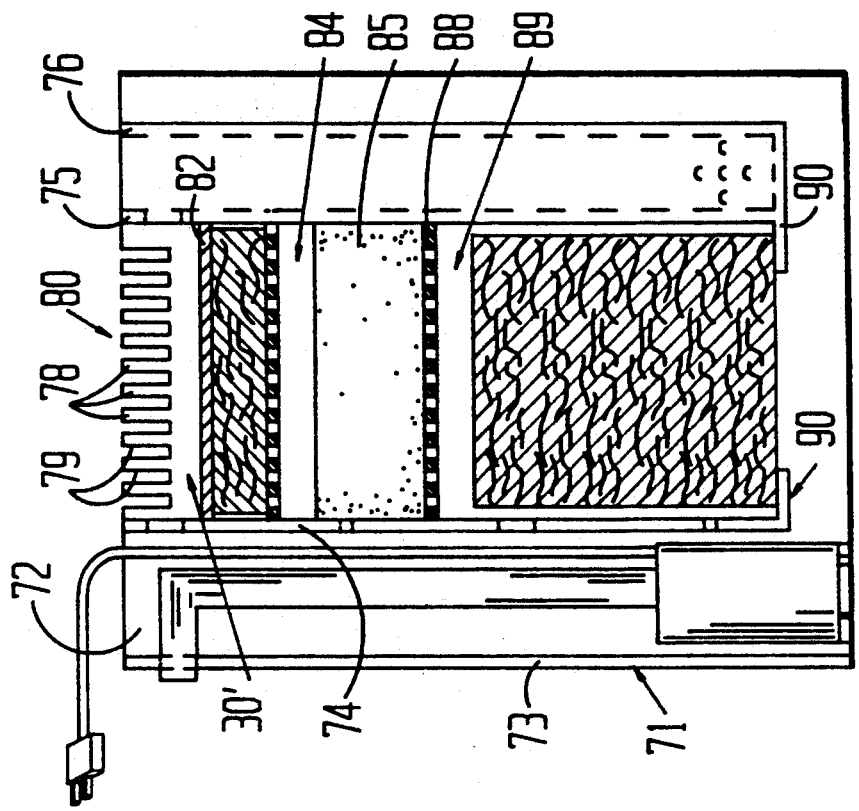
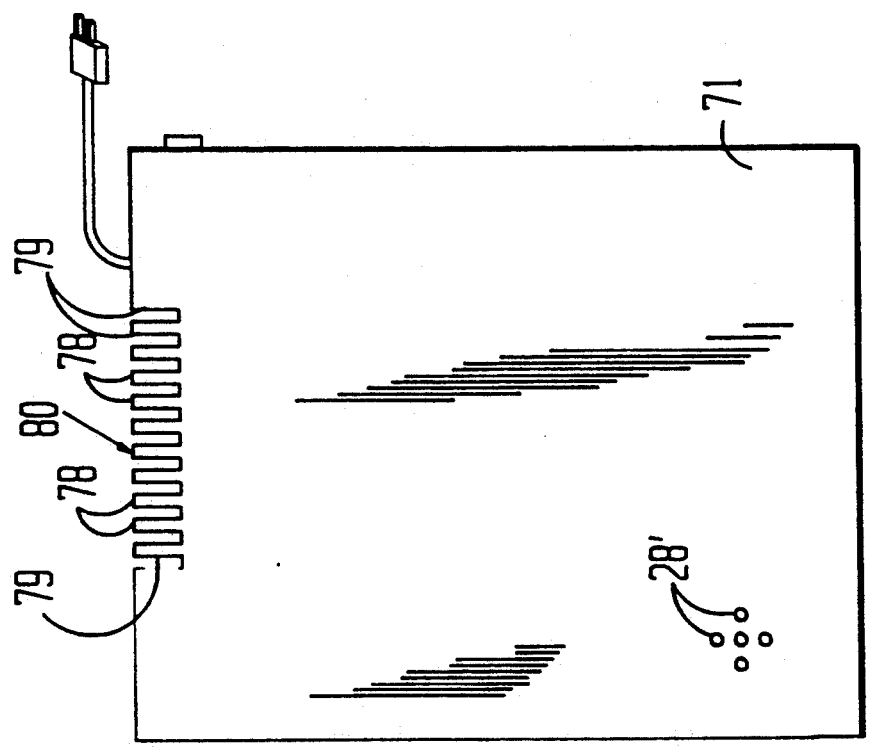
Fig. 10
Fig. 9

FILTRATION SYSTEM FOR A FISH TANK

This is a continuation-in-part of application Ser. No. 532,061 filed Jun. 1, 1990 which is now abandoned.

BACKGROUND OF THE INVENTION

The present invention relates to a filtration system for an aquarium which is particularly intended for use with salt water fish, commonly referred today as "reef tanks". In particular, the present invention relates to a highly simplified and efficient, self-contained, gravity fed, wet/dry filtration system which is intended to allow one to maintain a reef tank with a high number of marine aquatic specimens.

Various aquarium filtration systems are, of course, well known and in wide use for both fresh water and salt water tanks (e.g., U.S. Pat. Nos. 4,036,756 and 3,313,421). In both aquariums for home and professional use, it is well known to use a filtering system for removing impurities and waste material from the aquarium water, which comprises a separate filtering system external to the aquarium tank which has a siphon housing assembly and a filter-holding tank assembly. In this system, water is siphoned from the tank into the filter assembly, filtered, and then returned to the tank via a pump and further siphon. While generally satisfactory, these filter assemblies are rather cumbersome and unsightly, requiring the use of siphons which necessitate the provision of holes in the tank cover. In addition, priming the pumps of such filtering systems has proven to be a messy and inconvenient operation and, at best, it often involves a complicated and difficult procedure. A variety of in-tank bottom filtration systems are also known (e.g., U.S. Pat. Nos. 3,294,239 and 4,817,561), but these are generally inefficient, difficult to use and ineffective.

There are also many references to marine biological filtration systems. For example, Brock, U.S. Pat. No. 3,774,766, discloses a two-compartment filter assembly, the first being provided with a drip pan feed and an unsubmerged filter bed holding "splitrock" upon which aerobic bacteria are situated. Katz, U.S. Pat. No. 3,835,813, discloses a balanced system for purifying aquatic media, which comprises three filtration systems, namely, biological filtration, mechanical filtration and algae propagation. Smith, U.S. Pat. No. 4,002,566, discloses a system for purifying aquarium water which includes a filtration system, including a perforated plate for supporting a bed for establishing and maintaining a bacterial culture which cleans the aquarium water flowing therethrough.

However, here too, various disadvantages are found in these prior art devices when it is intended to use the same in conjunction with particularly small salt water or reef tanks and/or to maintain large numbers of marine aquatic life. For example, they generally are impractical by size and/or design for use with small volumes of water, i.e., 5.5, 10 or 20 gallon tanks. They are cumbersome to use (use of siphons, priming, etc.) and they generally do not provide sufficient filtering to support a high bio mass (i.e., number) of aquatic life. In fact, to the best of applicant's knowledge, there is no in-tank filter system available which affords a biological ecosystem for the long term maintenance of marine specimens in a small tank.

SUMMARY OF THE INVENTION

Accordingly, it is an object of the present invention to provide a simplified and improved wet/dry in-tank filter for an aquarium and, in particular, a small reef or salt water tank.

It is a more particular object of the present invention to provide such a filtration system which is easy to use, simple in construction, and highly efficient in operation.

It is a more particular object of the present invention to provide such a novel filtration system which is compact in design, inexpensive to manufacture, and reliable in operation, especially for small tanks of 20 gallons or less.

Certain of the foregoing and related objects are attained in an internally-situated filter assembly for an aquarium tank which includes an upright tank partition wall mounted within the aquarium for dividing the aquarium into an aquarium compartment and a filter compartment, inlet means formed in the partition wall generally adjacent to the top end thereof for allowing tank water in the aquarium compartment to flow into the filter compartment and outlet means formed in the partition wall for allowing filtered tank water to flow from the filter compartment into the aquarium compartment. Filter means are mounted in the filter compartment generally beneath the inlet means so that tank water may be fed thereto under the influence of gravity from the aquarium compartment. A catch basin is formed beneath the filter means and adjacent the bottom end of the filter compartment for collecting filtered water from the filter means. Pump means mounted within the catch basin, including conduit means communicating with the outlet means, serve to return filtered water collected in the catch basin to the aquarium compartment via the conduit and outlet means.

Preferably, the filter means includes a pre-filter means mounted in the filter compartment generally beneath the inlet means so that tank water may be fed thereto under the influence of gravity from the aquarium compartment. The pre-filter means includes a generally horizontally disposed, perforated pre-filter drip plate and a mechanical pre-filter means removably supported on the pre-filter drip plate. The filter means also includes a main filter assembly mounted in the filter compartment generally beneath the pre-filter assembly for receiving pre-filtered aquarium water from the pre-filter assembly. The main filter assembly includes a generally horizontally disposed, perforated post-filter drip plate and biological filter means removably supported on the post-filter drip plate.

The pre-filter means desirably comprises a removable, fibrous pre-filter medium which is in the form of a pad. Most advantageously, the biological filter means comprises DLS.

In a preferred embodiment of the invention, the assembly additionally includes compartment housing and support means for the pre-filter drip plate and a post-filter drip plate. These support means include a pair of spaced-apart partition side walls disposed normally to and positioned between the partition wall and a wall of the aquarium which is secured to the partition wall and the aquarium wall, so as to close off the pre-filter and main filter compartments. Most desirably, one of the side walls has at least one vent opening formed therein adjacent to the main filter compartment to allow for better aeration of said main filter compartment.

In a particularly preferred embodiment of the invention, the aquarium filter additionally includes a pumpless protein skimmer assembly. Most advantageously, the protein skimmer assembly has an inlet opening formed in the tank partition wall.

It is also especially advantageous if the pump means comprises a submersible pump and the tank partition wall and drip plates are made from plastic.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 4 is an exploded view of the pre-filter and main filter assemblies;

FIG. 5 is an exploded view of an alternate embodiment of the pre-filter and main filter assemblies;

FIG. 6 is a perspective view of a fish tank, equipped with an alternate embodiment of the filter system of the present invention, with portions broken away for purposes of clarity;

FIG. 9 is a rear elevational view of the filter assembly; and

FIG. 10 is a front elevational view of the filter assembly.

DETAILED DESCRIPTION OF THE PREFERRED EMBODIMENTS

Figure 1:
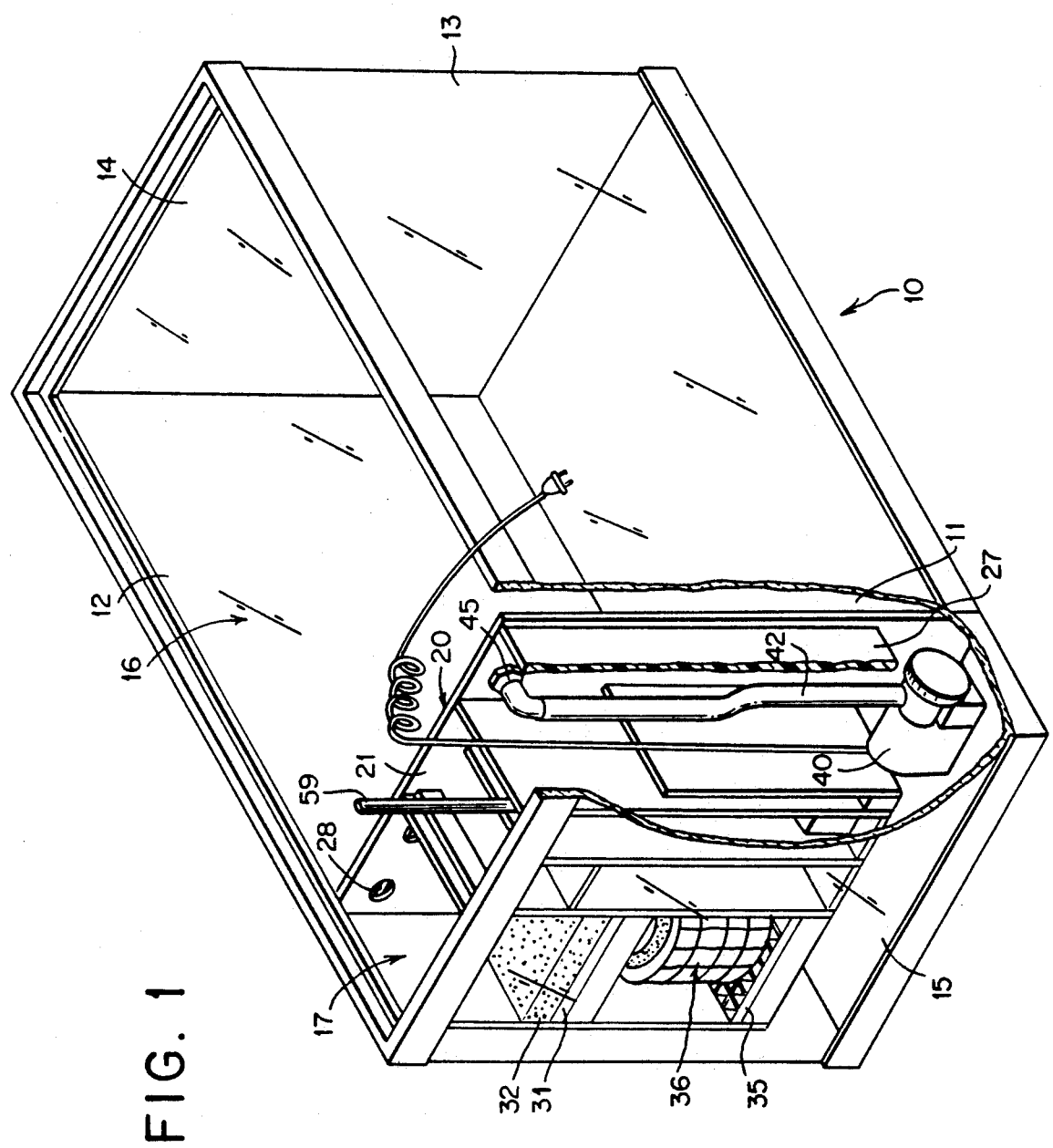
FIG. 1 is a perspective view of a fish tank, equipped with the filter system of the present invention, with portions broken away for purposes of clarity.
Figure 2:
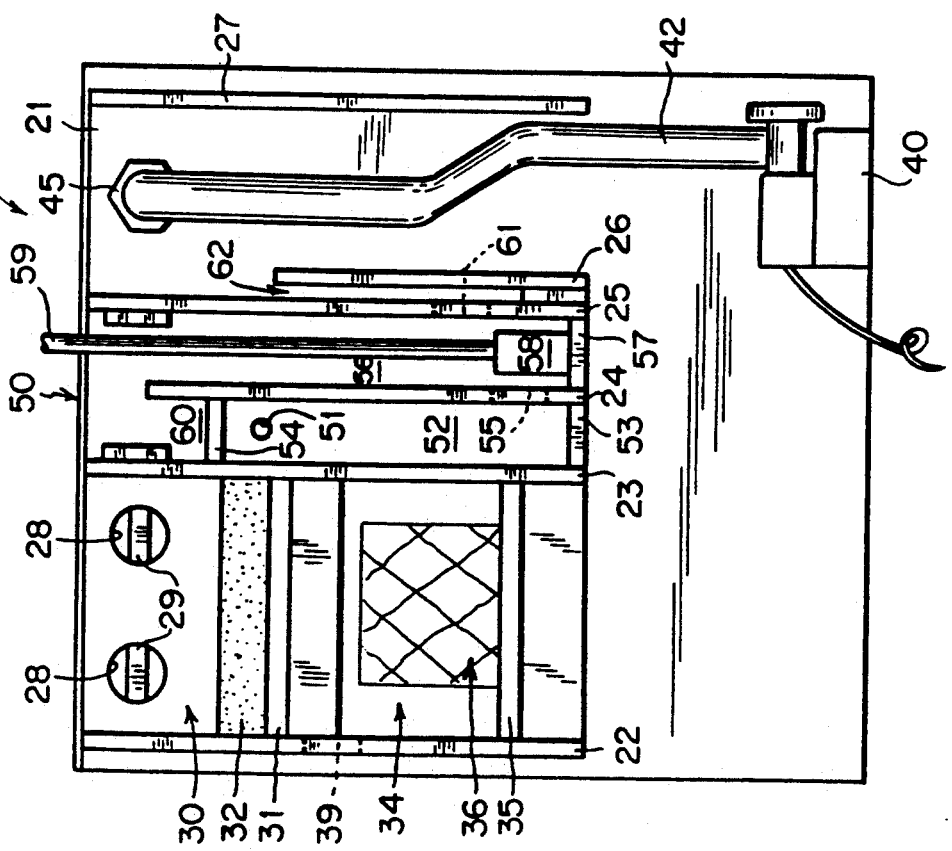
FIG. 2 is a front elevational view of the filter assembly.
Figure 8:
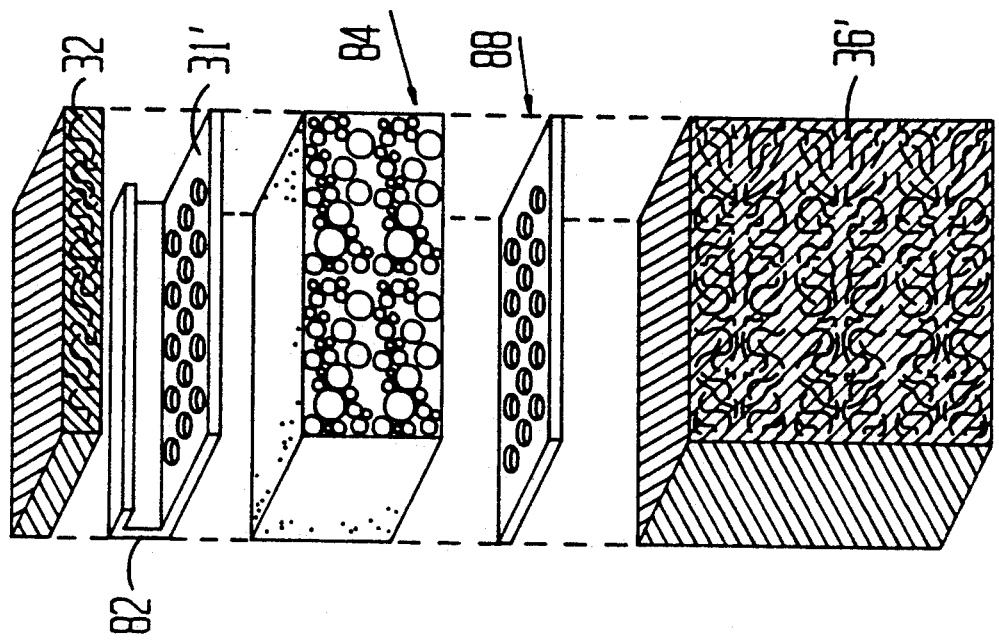
FIG. 8 is an exploded view of the pre-filter, chemical filter, and main biological filter assemblies.

Referring now in detail to the drawings and, in particular, to the FIGS. 1 and 2 thereof, therein illustrated is a novel siphonless, exclusively in-tank filter assembly for a conventional 5.5 gallon fish tank, the latter of which is generally designated by reference numeral 10, and is composed of a rectangular base wall 11, two opposite glass side walls 12, 13, and two opposite glass end walls 14, 15. The in-tank filter assembly of the present invention generally designated by reference numeral 20 is of the wet/dry, trickle or drip-type and includes an upstanding tank partition wall 21 which extends between tank side walls 12 and 13 and divides the aquarium into a relatively large aquarium compartment 16 and a small filter compartment 17 disposed side-by-side. Partition wall 21 is adhesively bonded to base wall 11 and side walls 12 and 13 to provide a watertight connection between the aquarium compartment 16 and the filter compartment 17. In addition, six upright support walls 22-27 extend normally between upright partition wall 21 and glass end wall 15 to further support tank partition wall 21 and to also provide filter partition housing walls as further described hereinafter. Preferably, the partition walls are made of acrylic plastic and are adhesively bonded to partition wall 21 by acrylic solvent cement. The acrylic members are preferably adhesively attached to the tank walls by non-toxic, room temperature-vulcanizing silicone.

Figure 3:
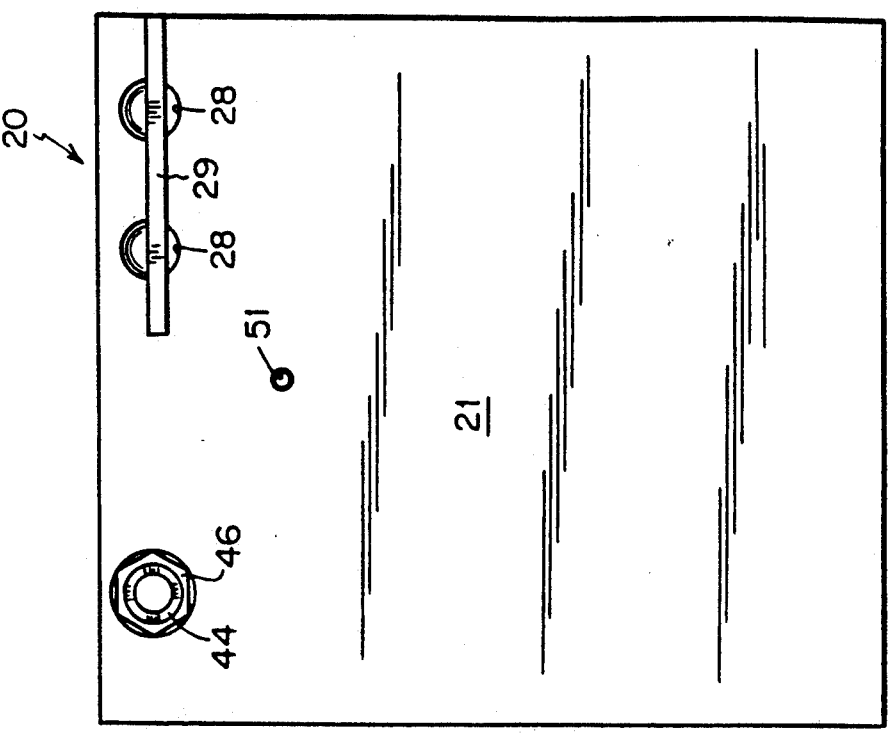
FIG. 3 is a rear elevational view of the filter assembly.

As seen best in FIGS. 2 and 3, tank partition wall 21 is provided with a pair of spaced-apart inlet openings 28 which allow tank water from the aquarium compartment 16 to enter the filter compartment 17. Situated on the tank compartment side of partition wall 21 across openings 28 is a skim bar 29 which serves to prevent surface scum from entering the filter and allows for greater oxygenation of marine water by providing a clean interface for oxygen/carbon dioxide exchange.

Tank water from the aquarium compartment is fed via gravity through inlet openings 28 into an unsubmerged pre-filter chamber 30 defined between side walls 22 and 23, the tank partition wall 21 and the glass wall 15. The base of the chamber is defined by a removable, perforated drip plate which supports a conventional fibrous pre-filter pad 32 which serves as a mechanical filter to remove insoluble, particulate matter from the water which flows through the pre-filter chamber at a relatively rapid rate. As seen in FIG. 4, the pre-filter drip plate 31 is preferably made of plastic and has a multiplicity of holes 33 formed therethrough, the edges of each hole being countersunk so as to provide each hole with a beveled edge. These beveled edges decrease surface tension, preventing bubbles from blocking water flow and thereby increasing the flow rate across the pre-filter plate 31.

Water flows through pre-filter drip plate 31 into an unsubmerged filter chamber 24. The filter chamber is also defined in part by the side walls 22, 23, the tank partition wall 21 and the glass wall 15, and the bottom thereof is formed by a removable post-filter drip plate 35 which supports a biological filter 36—namely, spirally wound, conventional two-ply DLS (double-layered spiral) filter made of an outer ply 37 of polyester, non-corrosive mesh material and an inner ply of shredded polyethylene stuffing 38. The DLS filter 36 serves to trap and maintain an area upon which nitrifying aerobic bacteria are situated. Due to the inherent large surface of the DLS material, large numbers of these bacteria are maintained, therefore, increasing the biological filtering capability of the filter chamber. The DLS filter 36 also allows the bacteria to stay in place despite high velocity water flow. Wash-off of bacteria off the filter media is thus prevented.

The plastic non-corrosive mesh spaces serve to allow rapid flow past these DLS pads. In addition, the mesh spaces provide void space which increase oxygen supply to the aerobic nitrifying bacteria and increases oxygen/carbon dioxide interchange between the tank water and the atmosphere. Filter compartment may be provided with an air inlet hole 39 to increase the oxygen supply.

FIG. 5 illustrates an alternate embodiment of the DLS filter 36' which is the form of a multi-ply pad composed of six polyethylene stuffing pads 38, separated by spacers 37' made of plastic, non-corrosive mesh material.

Conventional wet/dry filter systems recommend that filter media equals 10–13% of tank water volume. For salt water reef systems, this system uses a filter media of approximately 27 cu.in. for a tank water volume of approximately 1200 cu.in. In this system, the filter media is 2.3% of tank water volume. This represents an increase in efficiency.

From the filter chamber 34, water flows past the removable post-filter drip plate 35 constructed of non-corrosive latticework plastic. The grid-like post-filter plate helps keep the filter media 36, 36' in place. It also allows for a rapid water flow therethrough.

Once past the post-filter plate 35, water is collected in a sump and is maintained at a predetermined sump water level. Water is drawn by a submersible sump pump 40 and pumped via a plastic, non-corrosive connecting tubing 42 to an outlet nozzle 44, adjacent the top end of partition wall 21 to return filtered water to the tank compartment. The distal end of the return nozzle 44 is threaded and is retained in place by two plastic, non-corrosive bolts 45, 46. Once past nozzle 44, the water is tank water which maintains a predetermined tank water level. This water is now ready to be recycled as described above.

The above described system allows for long term maintenance of aquatic salt water specimens. The system, as presented, has only one moving part, the impeller of the sump pump motor. Long term maintenance consists of only cleaning or changing the pre-filter pad 32 at periodic intervals, adding fresh water to replace evaporated losses, as necessary, and normal periodic partial water changes to remove nitrates from the tank water.

Preferably, the system may include a protein skimmer assembly 50, as also illustrated in FIGS. 1 and 2, which serves to remove proteinaceous and other organic materials from the tank water. The protein skimmer assembly 50 is defined in part by vertical partition walls 23, 24, 25 and 26, partition wall 21 and end wall 15. The protein skimmer assembly has an inlet opening 51 in partition wall 21, to allow tank water to enter a pre-protein skimmer chamber 52, formed by the vertical support walls 23, 24, end wall 15, partition wall 21 and the horizontal base walls 53, 54. Inlet opening 51 is suitably dimensioned so that tank water will normally flow at a desired rate under pressure into chamber 52. This construction eliminates the need for a separate pump to feed water to the protein skimmer assembly as typically required in certain conventional systems. Water exits this chamber via a baffle hole 55 and then enters the protein skimming chamber 56 which is formed in part by the vertical support walls 24, 25 and the base wall 57. In the protein skimming chamber 56, tank water is rapidly aerated by fine bubbles produced from an air pump (not shown) which is connected to a 1" wood air stone 58, via air tubing 59. Highly proteinaceous and other organic solvent materials, coat the bubbles which come to the top of the protein skimmer chamber 56. Proteinaceous and other organic materials are deposited in a reservoir chamber 60 which is manually emptied from time to time, using a baster or other similar object. Tank water containing less proteinaceous and organic material, exits the protein skimmer chamber 56 via another baffle hole 61 into a small pre-sump chamber 62 formed in part by vertical support walls 25 and 26. This small pre-sump chamber prevents bubbles from entering the sump pump water, therefore, preventing bubbles from getting into the sump pump and the general tank water. From the pre-sump chamber 62, water passes over the vertical support wall 26 and becomes, in conjunction with water that has passed through the wet/dry filter system, sump water which maintains a determined sump water level. The sump water is drawn by sump pump 40 and is pumped via the connecting tubing 42 and nozzle 44 back into the tank water compartment 16, following which it may be recycled again and again.

The advantage of providing the additional protein skimmer assembly is that protein and other organic solvent materials are removed mechanically from the tank water. This decreases the biological waste which have to be handled by the wet/dry biological filter and, therefore, increases the biological load the system can safely handle. The system with or without the protein skimmer assembly can be scaled up in size to fit ten gallon and other larger tanks, if desired. In addition, the filter assembly components may preferably be made of plastic or other suitable materials and could be fabricated as one unit to simplify assembly. As can be appreciated, as a result of this system, no extraneous siphon tubes are necessary and an extremely simple water exchange between the filter compartment and the tank compartment takes place.

FIGS. 6 through 10 illustrate an alternate embodiment of the novel siphonless, in-tank filter assembly embodying the present invention for a conventional fish tank, the latter of which is again generally designated by reference numeral 10, and is composed of rectangular base wall 11, two opposite glass side walls 12, 13 and two opposite glass end walls 14, 15. The in-tank filter assembly of this embodiment of the present invention is generally designated by reference numeral 20', and again is of the wet/dry, trickle or drip type. However, in this case, the filter assembly 20' includes an upstanding L-shaped tank partition wall, generally designated 71, which is positioned to fit in a rear corner of the fish tank such that its longer front wall 72 abuts against end wall 14 and its short rear wall 73 abuts tank rear wall 13 thereby dividing the aquarium into a relatively large aquarium compartment 16 and a small filter compartment 17 disposed side-by-side in a generally front to rear relationship. Partition wall 71 is adhesively bonded to base wall 11 and end wall 14 and side wall 13 to provide a watertight connection between the aquarium compartment 16 and the filter compartment 17. In addition, three upright support walls 74, 75, 76 extend normally between upright partition front wall 72 and glass end wall 13 to further support tank partition wall 72 and to also provide filter partition housing walls as further described hereinafter. Here, too, the partition walls are preferably made of acrylic plastic and are adhesively bonded to partition wall 71 by acrylic solvent cement. The acrylic members are preferably adhesively attached to the tank walls by non-toxic, room temperature vulcanizing silicon.

Front tank partition wall 72 is provided with an inlet opening defined by a comb-like or rake-like gate generally designated 80 in the top edge thereof consisting of a multiplicity of upwardly directed tines or bars 78 separated by a multiplicity of inlet slots 79. This gate 80, while being similar to inlet openings 28 in allowing tank water from the aquarium compartment 16 to enter the filter compartment 17, also serves to prevent small fish from entering the filter assembly. In addition, they serve to allow surface scum to enter the filter and they also allow for greater oxygenation of the marine water by providing a clean interface for oxygen/carbon dioxide exchange.

Figure 7:
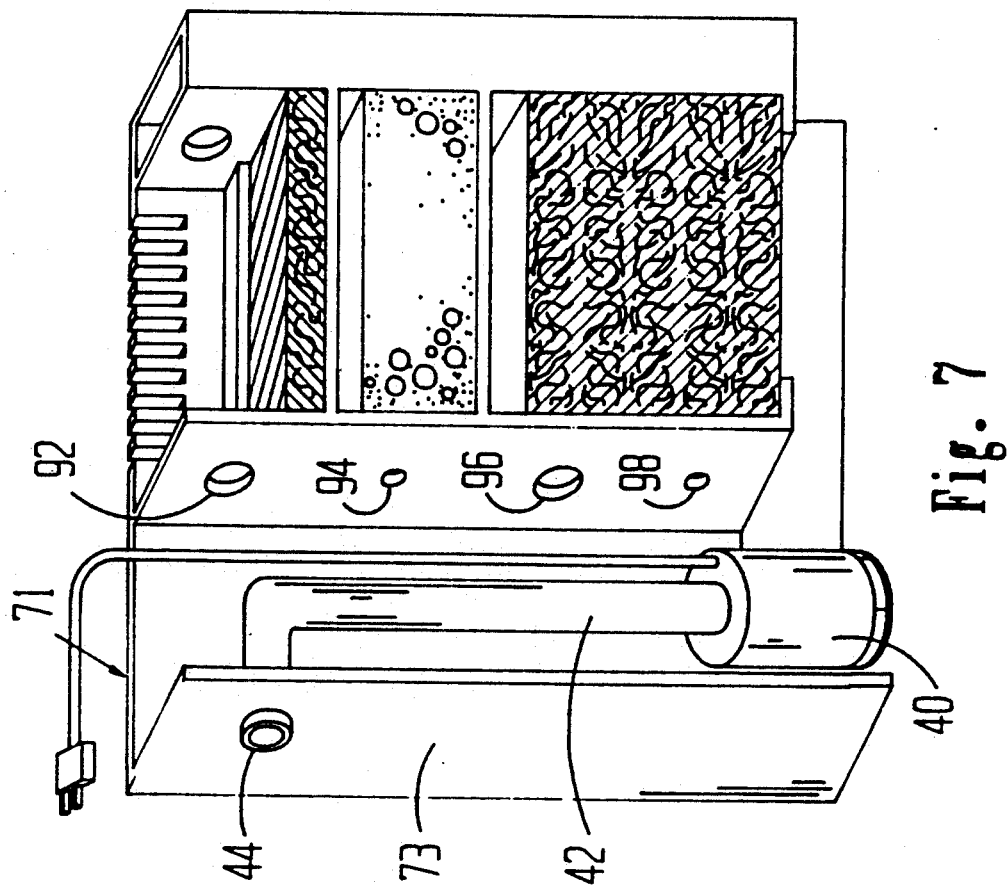
FIG. 7 is a enlarged perspective view of the filter system shown in FIG. 6.

As seen best in FIGS. 7 and 10, tank water from the aquarium compartment 16 is fed via gravity through the gate opening 80 into an unsubmerged pre-filter chamber 30' defined between side walls 74 and 75, the tank partition front wall 72 and the glass wall 13. The base of chamber 30' is defined by a removable, perforated drip plate 31' which supports a conventional fibrous pre-filter pad 32 which serves as a mechanical filter to remove insoluble, particulate matter from the water which flows through the pre-filter chamber at a relatively rapid rate. As seen best in FIG. 8, the perforated drip plate 31' has an upstanding inverted L-shaped flange 82 which is disposed adjacent the front partition wall 72 beneath the comb-like tines 79 and the inlet openings 80 so as to form a ledge. As a result of its position, water entering the gate opening 80 will flow in a cascading type manner onto flange 82 and subsequently into the center of the pre-filter pad 32 thereby assuring a uniform distribution of the water through the pre-filter pad 32 and subsequently through its drip plate 31'. The pre-filter drip plate 31' is preferably made of plastic and has a multiplicity of holes 33 formed therethrough similar to that of the FIG. 1 embodiment.

Water flows through pre-filter drip plate 31' into an unsubmerged chemical filter compartment generally designated 84, defined in part by walls 72, 74, 75 and 13, which contains a conventional chemical filtration means such as, for example, activated carbon 85 which serves to remove dissolved organic compounds and proteins from the water. Other conventional chemical additives or compounds may be used as well known by those skilled in the art. Following chemical filtration the water passes through drip plate 88 into the biological filter chamber 89 defined in part by the side walls 74, 75, the tank front partition walls 72, and the bottom thereof, being formed by a horizontal ledge 90 at the bottom of walls 74, 75 which support a biological filter 36''', similar to filter 36 or multiply pad 36' as formerly discussed in relation to FIGS. 4 and 5. Conventional biological material, such as DLS, which provides a low void space filter medium so as to provide a high surface area for bacterial colonization may be used.

From the filter chamber 89, water flows past and drips through the biological filter media 36''' following which it fall into the bottom of the filter compartment where it is collected in a sump and is maintained at a pre-determined sump water level. Water is drawn by a submersible sump pump 40 and pumped via a plastic non-corrosive connecting tubing 42 to an outlet nozzle 44, adjacent to the top end of rear partition wall 73 to return filtered water to the tank compartment. Once past nozzle 44, the water again becomes tank water which maintains a predetermined tank water level. The outlet nozzle 44 is located approximately 1½ inches below the water surface so as to provide some surface agitation, but not enough to cause light reflection from the tank light (not shown) and to increase gas exchange with the water and atmospheric air there above. The side mounting of the outlet nozzle also provides a good circular current through the tank. This water is now ready to be recycled as described above.

As can be seen best in FIG. 7, the pre-filter compartment 30', the chemical filtration compartment 84, and the biological filter compartment 89 are provided with a series of vents 92, 94, 96 and 98, respectively, which serve to ventilate the various chambers and prevent any water backup. This is particularly important for preventing positive gas pressure from building up in the chemical filter chamber. The vent in the biological filter compartment also serves to aerate the aerobic bacteria which require oxygen to survive. As a result of the fact that an unsubmerged biological filter bed is used which is exposed via the vents to oxygen, and as a result of being unsubmerged, the filter bacteria do not have to rely on obtaining dissolved oxygen from the water which is also required by the fish in the tank. As a result, and in contrast to an undergravel filter system, the bacteria do not compete with the fish in the tank for dissolved oxygen since they have their own source in this unsubmerged filter assembly which utilizes atmospheric air to maintain the bacteria colony. As a result, this creates a condition which maximizes the oxygen saturation in the water leaving the filter thereby maximizing the amount of oxygen available to the animals and livestock in the tank which, in turn, allows one to maximize the number of animals in the tank.

As can be seen best in FIG. 9, the front partition wall 71 also includes a series of small inlet openings 28' adjacent the bottom of the wall which provide for a bottom draw of water into the filter compartment 20' and with it, any heavier particles like detritus and other waste that may accumulate or settle at the bottom of the tank. Water from this bottom draw enters in through the bottom draw inlet openings 28' into a sealed chamber defined between front wall 71, upstanding walls 75 and 76, and rear wall 77 which form an upstanding rectangular chamber which has an opening 91 in wall 75 adjacent its top end to allow water to flow into the pre-filter chamber 30'. As can be appreciated, the water level in the bottom draw chamber will seek its own level relative to the tank compartment 16 and will carry with it the heavy waste material and transmit the same to the pre-filter chamber. As can be appreciated, this bottom draw will remove heavier particles, such as fish excrement and any other waste else that is not light enough to flow to the top of the tank. The bottom draw does not require a pump or any additional mechanical aid.

Various other modifications may be made as will be apparent to those skilled in the art. For example, although the in-tank filter assembly is shown mounted in a fixed permanent manner, it could be made with a removable filter composed of a filter housing which could be attached to the glass sidewalls by suction cups or hangers, if desired. In this case, the filter housing sidewall would define the tank "partition" wall. In addition, although the use of DLS has been found to be extremely advantageous for small reef tanks, other biological filter media may possibly be used.

Accordingly, while only several embodiments of the present invention has been shown and described, it is obvious that many changes and modifications may be made thereunto without departing from the spirit and scope of the invention.

I claim:
1. An internally-situated filter assembly for an aquarium comprising:
   an upright partition wall mounted within the aquarium for dividing said aquarium into a side-by-side aquarium compartment and a filter compartment defining a trickle-type filter chamber, said compartments and said partition wall each having a top end and a bottom end;
   inlet means in said partition wall for allowing tank water in said aquarium compartment to flow into said filter compartment, said inlet means being disposed adjacent said top end of said partition wall and including ancillary inlet means formed in said partition wall generally adjacent to the bottom end thereof for allowing tank water closer to said bottom end of said aquarium compartment to flow directly into said filter compartment and wherein said filter compartment includes a bottom draw compartment having a top end and bottom end into the latter of which said ancillary inlet means opens and an opening adjacent said top end of said bottom draw compartment which opens into said pre-filter compartment;

outlet means in said partition wall for allowing filtered tank water to flow from said filter compartment into said aquarium compartment;

filter means mounted exclusively in the tank in said filter compartment generally beneath said inlet means so that tank water may be fed directly thereto under the influence of gravity from said aquarium compartment, said filter means includes pre-filter means having a generally horizontally disposed, perforated pre-filter drip plate and a main filter assembly comprising wet/dry trickle-type biological filter means mounted in said trickle-type filter chamber of said filter compartment generally beneath said pre-filter assembly for receiving pre-filtered aquarium water from said pre-filter means, said pre-filter drip plate uniformly distributing water fed from the tank over the surface of said main filter in trickle-type fashion, said pre-filter means additionally including a mechanical filter;

a catch basin formed beneath said filter means and adjacent to said bottom end of said filter compartment for collecting filtered water from said filter means; and pump means mounted within the tank within said catch basin, including conduit means communicating with said outlet means, for returning filtered water collected in said catch basin to said aquarium compartment via said conduit and outlet means.

2. The aquarium filter assembly of claim 1, wherein said pre-filter means mounted in said trickle-type filter chamber in said filter compartment additionally includes said mechanical pre-filter means removably supported on said pre-filter drip plate; and said main filter assembly further includes a generally horizontally disposed, perforated post-filter drip plate, said biological filter means removably supported on said post-filter drip plate.

3. The aquarium filter assembly of claim 2, additionally including compartment housing and support means for said pre-filter drip plate and said post-filter drip plate, including a pair of spaced-apart partition side walls disposed normally to and positioned between said partition wall and a wall of said aquarium which is secured to said partition wall and said aquarium wall, so as to close off said pre-filter and main filter compartments.

4. The aquarium filter assembly of claim 1, wherein said pre-filter means comprises a removable, fibrous pre-filter medium.

5. The aquarium filter assembly of claim 1, wherein said pre-filter means is in the form of a pad.

6. The aquarium filter assembly of claim 1, wherein said biological filter means comprises DLS.

7. The aquarium filter assembly of claim 1, wherein one of said side walls has at least one vent opening formed therein, adjacent to said main filter compartment to allow for better aeration of said main filter compartment.

8. The aquarium filter assembly of claim 1, wherein said partition wall and said drip plates are made from plastic.

9. The aquarium filter assembly of claim 1, wherein said pump means comprises a submersible pump mounted in said catch basin.

10. The aquarium filter assembly of claim 1, wherein said aquarium filter additionally includes a protein skimmer assembly.

11. The aquarium filter assembly of claim 10, wherein said protein skimmer assembly has an inlet opening formed in said partition wall.

12. The aquarium filter assembly of claim 1, wherein said filter means additionally includes a chemical filtration compartment containing chemical filtration means disposed between said pre-filter means and said main filter.

13. The aquarium filter assembly of claim 12, wherein one of said side walls has at least one vent opening formed therein, adjacent to said pre-filter compartment, said chemical filter compartment, and said main filter compartment to allow for better aeration of said compartments.

14. The aquarium filter assembly of claim 1, wherein said upright partition wall has a top edge and wherein said inlet means comprises a gate-like opening formed in said top edge of said upright partition wall which includes a plurality of spaced-apart tines between which water may flow into said filter compartment.

15. The aquarium filter assembly of claim 1, wherein said partition wall is part of a filter housing defining said filter compartment.

16. The aquarium filter assembly of claim 1, wherein said inlet means, ancillary inlet means and said outlet means, each comprise at least one opening formed in said partition wall.

* * * * *